United States Patent
Eisenschlos et al.

(10) Patent No.: US 11,610,061 B2
(45) Date of Patent: Mar. 21, 2023

(54) MODIFYING TEXT ACCORDING TO A SPECIFIED ATTRIBUTE

(71) Applicant: ASAPP, INC., New York, NY (US)

(72) Inventors: Julian Martin Eisenschlos, Zurich (CH); Tao Lei, Jersey City, NJ (US)

(73) Assignee: ASAPP, INC., New York, NY (US)

( * ) Notice: Subject to any disclaimer, the term of this patent is extended or adjusted under 35 U.S.C. 154(b) by 181 days.

(21) Appl. No.: 16/699,825

(22) Filed: Dec. 2, 2019

(65) Prior Publication Data

US 2021/0165960 A1    Jun. 3, 2021

(51) Int. Cl.
*G06F 40/284*    (2020.01)
*G06F 40/30*     (2020.01)
*G06F 40/295*    (2020.01)
*G06F 40/253*    (2020.01)
*G06N 3/04*      (2006.01)
*G06N 3/08*      (2006.01)
*G06Q 30/00*     (2012.01)
*G06Q 30/016*    (2023.01)

(52) U.S. Cl.
CPC .......... *G06F 40/284* (2020.01); *G06F 40/253* (2020.01); *G06F 40/295* (2020.01); *G06F 40/30* (2020.01); *G06N 3/0454* (2013.01); *G06N 3/08* (2013.01); *G06Q 30/016* (2013.01)

(58) Field of Classification Search
CPC ...... G06F 40/284; G06F 40/30; G06F 40/295; G06F 40/253; G06N 3/0454; G06N 3/08; G06Q 30/016
USPC ......................................................... 704/9
See application file for complete search history.

(56) References Cited

U.S. PATENT DOCUMENTS

| | | | | |
|---|---|---|---|---|
| 6,647,340 | B1* | 11/2003 | Pemble | G01S 19/08 |
| | | | | 340/992 |
| 7,302,394 | B1* | 11/2007 | Baray | G10L 15/18 |
| | | | | 704/E15.041 |
| 10,268,749 | B1* | 4/2019 | Roy | G06F 16/285 |
| 10,546,154 | B2* | 1/2020 | Praveen | G06K 9/00536 |
| 10,565,498 | B1* | 2/2020 | Zhiyanov | G06N 7/005 |

(Continued)

OTHER PUBLICATIONS

Devlin, et al., "BERT: Pre-training of Deep Bidirectional Transformers for Language Understanding", CoRR arXiv:1810.04805v2 [cs.CL], https://arxiv.org/pdf/1810.04805.pdf (accessed on Mar. 21, 2020), May 24, 2019, 16 pages.

(Continued)

*Primary Examiner* — Akwasi M Sarpong
(74) *Attorney, Agent, or Firm* — GTC Law Group PC & Affiliates

(57) ABSTRACT

Text may be modified according to a specified attribute value, such as changing a 1-star review to a 5-star review. To modify the text, an input sequence of tokens may be obtained corresponding to the text. Mask scores may be computed for the tokens by processing the input sequence of tokens with masking neural network. One or more tokens may be selected using the mask scores, and a masked sequence of tokens may be generated by replacing the selected tokens with a mask token. The masked sequence of tokens may be processed by a language model neural network to select a replacement token for each of the mask tokens. Modified text may then be generated using the selected replacement tokens. The modified text may be used for any appropriate application, such as suggesting messages to users participating in a conversation.

21 Claims, 7 Drawing Sheets

110

The food was pretty bad, I would not go there again.

↓

120

The food was pretty [MASK], I would [MASK] go there again.

↓

130

The food was pretty good, I would love to go there again.

(56) References Cited

U.S. PATENT DOCUMENTS

| | | | | |
|---|---|---|---|---|
| 10,671,878 | B1* | 6/2020 | Sarshogh | G06V 10/25 |
| 10,878,186 | B1* | 12/2020 | Liu | G06K 9/6296 |
| 2004/0003403 | A1* | 1/2004 | Marsh | H04N 21/4755 |
| | | | | 725/52 |
| 2007/0203852 | A1* | 8/2007 | Cameron | G06Q 20/367 |
| | | | | 705/65 |
| 2010/0042643 | A1* | 2/2010 | Pattabhi | G06F 16/256 |
| | | | | 707/E17.005 |
| 2014/0006423 | A1* | 1/2014 | Melnychenko | G06F 16/24578 |
| | | | | 707/749 |
| 2015/0301723 | A1* | 10/2015 | Engle | H04L 12/1822 |
| | | | | 715/753 |
| 2015/0356736 | A1* | 12/2015 | Lee | G06T 7/0012 |
| | | | | 382/283 |
| 2016/0359900 | A1* | 12/2016 | Crisler | H04L 63/1441 |
| 2017/0017852 | A1* | 1/2017 | Su | G06T 7/90 |
| 2017/0109625 | A1* | 4/2017 | Dai | G06N 3/084 |
| 2017/0178234 | A1* | 6/2017 | Jezek, Jr | G06Q 40/04 |
| 2018/0019879 | A1* | 1/2018 | Kravitz | G06Q 20/401 |
| 2018/0285599 | A1* | 10/2018 | Praveen | G06F 40/166 |
| 2019/0121810 | A1* | 4/2019 | Zhuang | G06F 16/213 |
| 2019/0370587 | A1* | 12/2019 | Burachas | G06N 3/0445 |
| 2020/0065716 | A1* | 2/2020 | Aharonov | G06N 20/00 |
| 2020/0104716 | A1* | 4/2020 | Venkatesha | G06N 3/082 |
| 2020/0401661 | A1* | 12/2020 | Kota | G06N 20/00 |
| 2021/0216687 | A1* | 7/2021 | Nakatani | G06N 3/08 |

OTHER PUBLICATIONS

Ghazvininejad, et al., "Mask-Predict: Parallel Decoding of Conditional Masked Language Models", CoRR arXiv:1904.09324v2 [cs.CL], https://arxiv.org/pdf/1904.09324.pdf (accessed Mar. 21, 2020), Sep. 4, 2019, 10 pages.

Gu, et al., "Levenshtein Transformer", CoRR arXiv:1905.11006v2 [cs.CL], https://arxiv.org/pdf/1905.11006.pdf (accessed on Mar. 21, 2020), Oct. 28, 2019, 17 pages.

Guu, et al., "Generating Sentences by Editing Prototypes", CoRR arXiv: 1709.08878v2 [cs.CL], https://arxiv.org/pdf/1709.08878.pdf (accessed Mar. 21, 2020), Sep. 7, 2018, 14 pages.

Li, et al., "Delete, Retrieve, Generate: A Simple Approach to Sentiment and Style Transfer", CoRR arXiv:1804.06437v1 [cs.CL], https://arxiv.org/pdf/1804.06437.pdf (accessed on Mar. 21, 2020), Apr. 17, 2018, 12 pages.

Logeswaran, et al., "Content preserving text generation with attribute controls", 32nd Conference on Neural Information Processing Systems (NeurIPS 2018), Montréal, Canada, https://papers.nips.cc/paper/7757-content-preserving-text-generation-with-attribute-controls.pdf (accessed on Mar. 21, 2020), 2018, 11 pages.

Shen, et al., "Style Transfer from Non-Parallel Text by Cross-Alignment", CoRR abs/1705.09655, http://arxiv.org/abs/1705.09655, Nov. 6, 2017, 12 pages.

Wang, et al., "Toward Unsupervised Text Content Manipulation", CoRR arXiv:1901.09501v2 [cs.CL], https://arxiv.org/pdf/1901.09501.pdf (accessed Mar. 21, 2020), Feb. 8, 2019, 12 pages.

Wu, et al., "A Hierarchical Reinforced Sequence Operation Method for Unsupervised Text Style Transfer", CoRR arXiv:1906.01833v1 [cs.CL], https://arxiv.org/pdf/1906.01833.pdf (accessed on Mar. 21, 2020), Jun. 5, 2019, 11 pages.

Zhao, et al., "Adversarially Regularized Autoencoders", Proceedings of the 35th International Conference on Machine Learning, PMLR 80:5902-5911 and supplement, http://proceedings.mir.press/v80/zhao18b/zhao18b.pdf & http://proceedings.mir.press/v80/zhao18b/zhao18b-supp.pdf (accessed on Mar. 21, 2020), 2018, 16 pages.

* cited by examiner

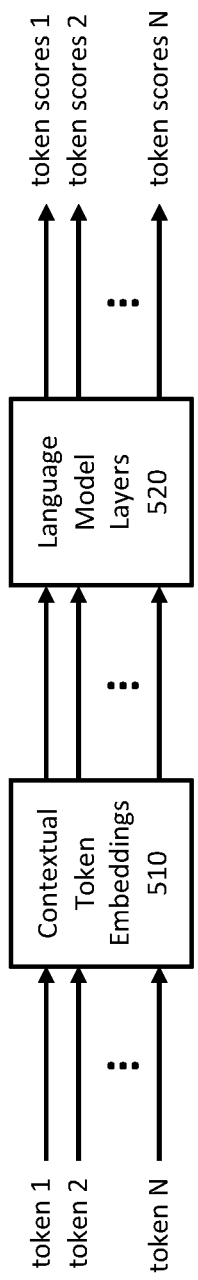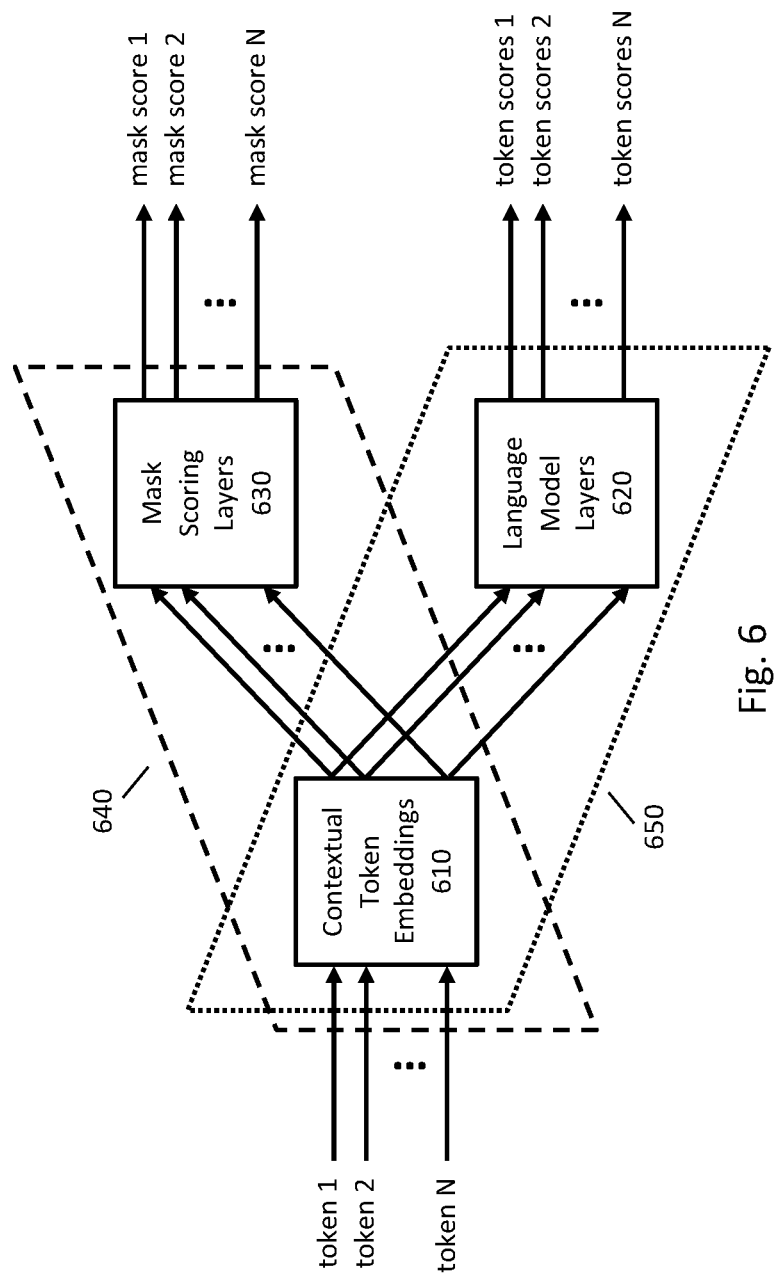

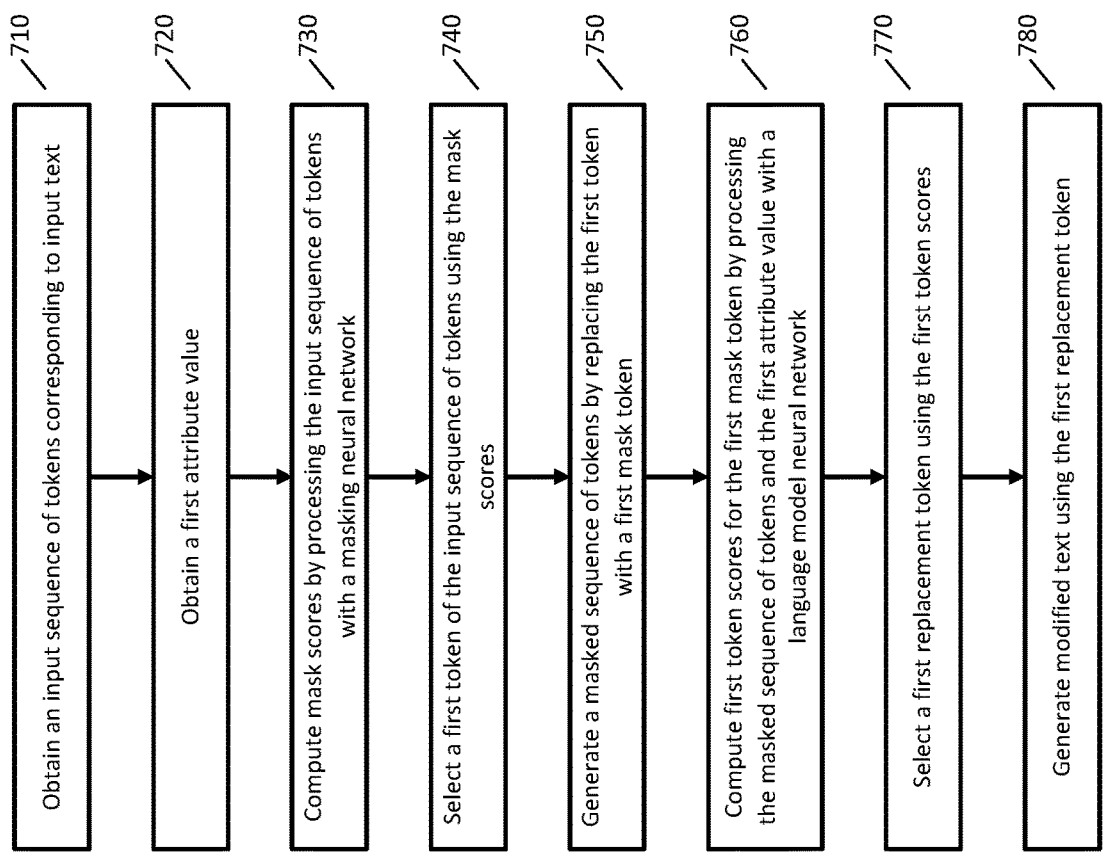

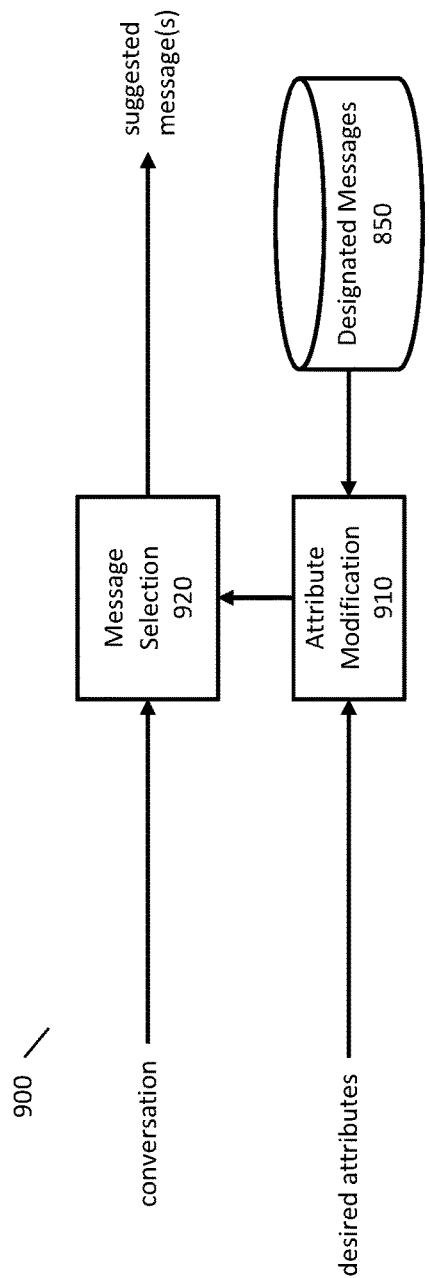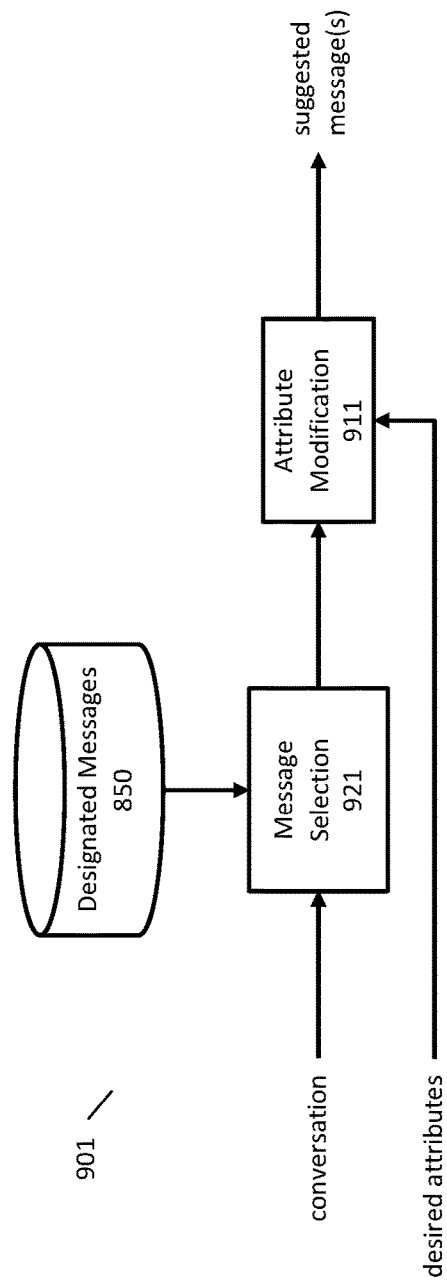

MODIFYING TEXT ACCORDING TO A SPECIFIED ATTRIBUTE

BACKGROUND

Existing text may be available to be used in an application. For example, a messaging application may suggest a message to a user of the application to send to another user. The messages to be suggested may be selected from a pool of existing messages.

Text from a message in the pool of existing messages may have an aspect that is not appropriate for a subsequent message, even if another aspect of the message is still useful. Accordingly, techniques for changing an aspect of text but keeping other aspects of text be desirable for some applications, such as an application for suggesting messages to users.

BRIEF DESCRIPTION OF THE FIGURES

The invention and the following detailed description of certain embodiments thereof may be understood by reference to the following figures:

FIG. 1 illustrates an example of modifying an attribute of text.

FIG. 2 is an example system for modifying an attribute of text.

FIG. 5 is an example implementation of a pretrained language model.

FIG. 6 is an example implementation of a masking neural network and a language model neural network using a pretrained language model.

FIG. 7 is a flowchart of an example method for modifying an attribute of text.

FIGS. 9A and 9B are two example systems for implementing a suggestion service.

DETAILED DESCRIPTION

Figure 3:
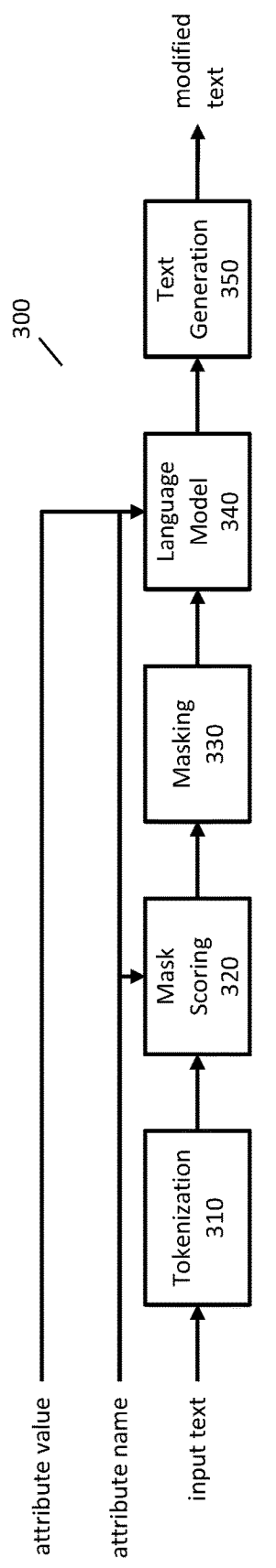
FIG. 3 is an example system for modifying an attribute of text by masking tokens and selecting replacement tokens.

An existing corpus of text or set of text items may be used in a variety of applications. For one non-limiting example, an application may suggest a message to a user to send to another user. A set of messages that may be suggested to users may be prepared in advance and referred to as a set of designated messages. The set of designated messages may be reviewed before use to improve the quality of suggested messages. For example, the messages may be reviewed to have proper grammar and spelling or to avoid the use of possibly offensive language.

In some applications, it may be desired to modify the text before using the text in the application, but to keep other aspects of the text the same or suitably adjusted. For example, a text may use present tense verbs and it may be desired to change the text to past tense verbs. For another example, a text may use phrasing that is appropriate for the morning (e.g., "Good morning, how can I help you?") and it may be desired to change the text so that it is appropriate for other times (e.g., "Good afternoon, how can I help you?"). Examples of the present disclosure are capable to change an attribute of the text. As used herein, an attribute of the text includes any aspect of the text that may be represented as a value. In some implementations, text may have more than one attribute associated with it, and each attribute may be specified using an attribute name and an attribute value. For example, an attribute name may be a star_rating (e.g., for a review of a product or business) and the attribute value may correspond to possible values (e.g., 1 to 5 stars). Attribute names and values may be specified using any appropriate techniques, such as numbers or strings.

FIG. 1 illustrates an example of modifying an attribute of text. In FIG. 1, the input text 110 is a review of a restaurant, where the text corresponds to a 1-star review. It is desired to modify input text 110 to make it applicable for a 5-star review, but to otherwise keep the text the same. In a first step, words of input text 110 are identified for modification, and masked text 120 is created by replacing one or more words of input text 110 with a special mask token to indicate that the word is to be modified. In a second step, one or more words are selected for each mask token of masked text 120 to generate modified text 130. Modified text 130 may then be used in an application as an example of a 5-star review.

FIG. 2 is an example system 200 for modifying input text to generate modified text. System 200 receives as input, the input text to be modified, an attribute name for the attribute to be modified and a desired attribute value for the attribute. For example, the attribute name may be star_rating and the attribute value may be 5. Attribute modification component 210 receives these inputs and generates modified text that corresponds to the specified attribute value. Attribute modification component 210 may be implemented using any of the techniques described herein.

In some implementations, where only one attribute is used (e.g., the only attribute to be modified is a star_rating) then the attribute name may be omitted as it is understood that the attribute value corresponds to the one attribute. Throughout this disclosure, wherever an attribute name is used, it is understood that the attribute name may be omitted where only one attribute is to be modified or where an attribute value (or any type of attribute identifier) may otherwise be matched to an attribute name (e.g., as a positional argument to a function).

In some implementations, multiple attributes may be modified simultaneously. For example, the following are possible implementations for modifying multiple attribute values simultaneously: attribute modification component 210 may receive as input (i) a second attribute name and a second attribute value, (ii) a list of pairs of attribute names and attribute values, (iii) multiple attribute values where it is specified within attribute modification component 210 that a first attribute value corresponds to a first attribute name, a second attribute value corresponds to a second attribute name, and so forth.

Any appropriate attributes of text may be modified. The following are non-limiting examples of attributes that may be modified in text: a rating (e.g., a star rating), a sentiment (e.g., positive, negative, or neutral), a natural language intent (e.g., an intent to purchase a product or to return a product), a named entity (e.g., a person or location), a verb tense (e.g., present, past, or future), a time of day (e.g., morning, afternoon, or evening), a time of year (e.g., the current month), a tone (e.g., formal, casual, or playful), a singular/plural reference, a product or service description (e.g., converting text to be used for multiple products or services, and/or to update a previously used description or portion thereof), a place (e.g., to modify text based on a location of a user, and/or to adjust a place reference where a location associated with the text has changed), or a person (e.g., to modify text to match the writing style of an individual, and/or to adjust a person reference where a person in a particular role, agent, or the like has changed).

FIG. 3 is an example system 300 for modifying input text to generate modified text by masking words or tokens and selecting replacement words or tokens. The inputs to system 300 are the input text to be modified, an attribute name for the attribute to be modified and a desired attribute value for the attribute.

Tokenization component 310 receives as input the input text to be modified and generates an input sequence of tokens to represent the input text. As used herein, a token is any value that may be used to represent a portion of the input text. For example, a token may represent a word, characters other than words (e.g., punctuation), a portion of a word, or multiple words. Any appropriate tokenization may be used, and any appropriate token values may be used. For example, in some implementations, the text may be tokenized by splitting the text on white space and considering each word of the text as a token.

In some implementations, tokenization component 310 may use byte-pair encodings to represent the input text. With byte-pair encoding, each token may consist of one or more characters, and each word may be represented by one or more tokens. In some implementations, the tokens may be determined using an iterative process where the tokens are initialized to the letters or characters of the alphabet (e.g., a-z, A-Z, and possibly other characters such as digits or punctuation). At each iteration, counts of pairs of adjacent tokens may be determined, and a most frequently occurring pair of tokens may be merged into a single token. For example, at a first iteration the token "s" followed by "t" may be the most frequent pair, and instances of this pair may be replaced by the token "st". This process may be repeated until a desired stopping point has been reached, such as a total number of iterations. The final set of tokens may then be used to represent the words of the input text.

In some implementations, tokenization component 310 may use word piece encodings to represent the input text. Word-piece encodings may be created in a similar manner to byte-pair encodings except that the criteria for merging tokens may be different. To determine a pair of tokens to be merged, a language model may be created from the training data, and a pair of tokens may be merged to maximize the likelihood of the language model on the training data at each iteration. The final set of tokens may then be used to represent the words of the input text.

Mask scoring component 320 receives as input the input sequence of tokens and the attribute name. For tokens of the input sequence of tokens, mask scoring component may compute a mask score indicating whether the token should be modified to change an attribute value corresponding to the attribute name. Any appropriate mask scores may be used, such as a number between 0 and 1, a number from 0 to 100, or a boolean value. Mask scoring component 320 may use any appropriate techniques to compute mask scores for tokens of the input sequence of tokens.

In some implementations, mask scoring component 320 may include a masking neural network that processes the input sequence of tokens to compute the mask scores. The masking neural network may process any appropriate representation of the input sequence of tokens. For example, masking neural network may process the tokens directly, may process embeddings of the tokens, or may process indices of the tokens into a vocabulary of tokens.

A token embedding is a vector in a vector space that represents the token but does so in a manner that preserves useful information about the meaning of the token. For example, the token embeddings may be constructed so that tokens with similar meanings or categories may be close to one another in the vector space. For example, the token embeddings for "cat" and "cats" may be close to each other because they have similar meanings, and the tokens "cat" and "dog" may be close to each other because they both relate to pets. Tokens embeddings may be trained in advance using a training corpus, and when obtaining the token embeddings, a lookup may be performed to obtain a token embedding for each token of the input sequence of tokens.

Any appropriate techniques may be used to compute token embeddings from a training corpus. For example, the tokens of the training corpus may be converted to one-hot vectors where the one-hot vectors are the length of the vocabulary and the vectors are 1 in an element corresponding to the token and 0 for other elements. The one-hot vectors may then be processed using any appropriate techniques, such as the techniques implemented in Word2Vec or GloVe software. A token embedding may accordingly be created for each token in the vocabulary.

A masking neural network may include any appropriate neural network, such as one or more of the following: a recurrent neural network, a bidirectional recurrent neural network, a recurrent neural network with long short-term memory, an attention layer, a self-attention layer, a multi-head attention layer, fully connected layers, an encoder-decoder structure, a bidirectional transformer, a deep bidirectional transformer, or bidirectional encoder representations from transformers (BERT).

In some implementations, the input to the masking neural network may be a sequence of tokens that represent the input text and also the attribute to be masked. For example, the following sequence of tokens may be used:

[CLS] [ATTR] [SEP] T1 T2 T3 T4 [SEP]

where [CLS] is a special start token to indicate the beginning of the input sequence, [ATTR] is a special token to indicate the attribute to masked (e.g., a token for the attribute name), [SEP] is a special separator token, and T1, T2, T3, and T4 are tokens representing the input text. The number of tokens of the input text is 4 in this example, and the number of tokens may vary according to the length of the input text. Where mask scoring component 320 is masking more than one attribute, then more than one attribute name token may be included between the [CLS] token and the first [SEP] token.

In some implementations, the input to the masking neural network may include additional information. For example, the input may include a segment indicator (e.g., whether the input corresponds to the attribute or the input text) and a token position indicator or a relative-position indicator (since the input to the masking neural network may not otherwise indicate an order of the tokens), such as the following:

| Token: | [CLS] | [ATTR] | [SEP] | T1 | T2 | T3 | T4 | [SEP] |
|---|---|---|---|---|---|---|---|---|
| Segment: | A | A | A | B | B | B | B | B |
| Position: | 0 | 1 | 2 | 3 | 4 | 5 | 6 | 7 | where the first row indicates the tokens of the input, the second row indicates a segment, and the third row indicates the index of the token in the input. The input to the masking neural network may be any combination of each column of the above table.

In some implementations, embeddings may be computed for each of the tokens, the segment indicators, and the position indicators

| Token: | $E_{[CLS]}$ | $E_{[ATTR]}$ | $E_{[SEP]}$ | $E_{T1}$ | $E_{T2}$ | $E_{T3}$ | $E_{T4}$ | $E_{[SEP]}$ |
|---|---|---|---|---|---|---|---|---|
| Segment: | $E_A$ | $E_A$ | $E_A$ | $E_B$ | $E_B$ | $E_B$ | $E_B$ | $E_B$ |
| Position: | $E_0$ | $E_1$ | $E_2$ | $E_3$ | $E_4$ | $E_5$ | $E_6$ | $E_7$ | where the embeddings may be computed using similar techniques as described above for the token embeddings. The input to the masking neural network may be any combination of each column of the above table. For example, the embeddings of each column may be concatenated or summed.

The masking neural network may compute a mask score for each of the input tokens or for each of the tokens of the input text. Where a mask score is computed for tokens other than of the input text (e.g., the [CLS] and [SEP] tokens), then those mask scores may not be used.

Masking component 330 receives the mask scores from mask scoring component 320 and generates a masked sequence of tokens by replacing one or more tokens of the input sequence of tokens with a special mask token. Masking component 330 may use any appropriate techniques for selecting tokens to be masked. For example, masking component 330 may mask all tokens whose mask score is above a threshold or may mask a number of tokens having the highest mask scores.

In some implementations, masking component 330 may perform additional processing to change the number of mask tokens in the masked sequence of tokens. When changing an attribute of text, the number of tokens to represent the attribute in the modified text may be different from the number of tokens in the original text. For example, in FIG. 1, the input text corresponds to a 1-star review, and the token "not" was masked. When changing the input text to a 5-star review, the mask token from "not" may be replaced with two mask tokens, and these two mask tokens may be replaced with the token "love" and the token "to", respectively.

In some implementations, a single mask token or a sequence of consecutive mask tokens may be replaced by a different number of mask tokens. Any appropriate techniques may be used to determine the number of replacement mask tokens. In some implementations, a masked sequence of tokens may be generated using the mask scores as described above. The masked sequence of tokens may then be modified by replacing consecutive sequences of mask tokens with a single mask token. The masked sequence of tokens may then be processed by a mask-size neural network that computes a number of mask tokens to be inserted for each mask token in the masked sequence of tokens. The masked sequence of tokens may then be further modified by replacing each mask token with the number of mask tokens computed by the mask-size neural network. The final version of the masked sequence of tokens may then be output by masking component 330.

A mask-size neural network may be implemented using any appropriate techniques, such as any of the techniques described herein. For example, a mask-size neural network may be implemented as a classifier where the classes of the classifier correspond to possible lengths of mask tokens, such as classes being numbers ranging from 0 to 8 (where 0 would allow removal of the mask token) or numbers ranging from 1 to 8. The mask-size neural network may compute class scores or probabilities for each mask token of the masked text and the number of mask tokens to be used may be selected according to the number with the highest score. In some implementations, the mask-size neural network may compute class scores for all tokens of the masked text (not just the mask tokens), and the class scores for tokens other than the mask tokens may not be used. The input to the mask-size neural network may include any combination of a token corresponding to the attribute name, a token corresponding to the attribute value, and the masked sequence of tokens.

Language model component 340 may receive as input the masked sequence of tokens from masking component 330, the attribute name, and the desired attribute value. Language model component 340 may then compute token scores (e.g., probabilities or likelihoods) for each mask token in the masked sequence of tokens to select tokens that correspond to the desired attribute value. A language model may be any mathematical model that computes scores or probabilities corresponding to sequences of words. For example, the sequence "black cat" may have a higher score because it is a relatively common sequence of words, and the sequence "cat umbrella" may have a lower score because it is relatively rare sequence of words.

A language model may be associated with a vocabulary of tokens. For example, the language model may be associated with a vocabulary of 50,000 tokens. When computing token scores for a mask token, the language model may compute a vector for each mask token, where the length of the vector is the size of the vocabulary, and each element of the vector indicates a match for the corresponding token of the vocabulary to the mask token. For example, for selecting tokens for a 5-star review, the token "good" would likely get a high score and the token "bad" would likely get a low score.

Language model component 340 may use any appropriate language model to compute token scores, such as a neural network language model. A neural network language model may be implemented using any of the techniques described herein. A language model neural network may process a sequence of tokens similar to the sequence of tokens processed by the masking neural network. A language model neural network may also process an attribute value. In some implementations, a language model neural network may process a sequence of tokens such as the following

[CLS] [ATTR] 5 [SEP] T1 T2 [MASK] T4 [SEP]

where the tokens are as described above with the addition of the token "5" to indicate an attribute value of 5 stars and with token T3 being replaced by the [MASK] token. Where language model component 340 is processing more than one attribute, then more than one attribute name token and attribute value may be included between the [CLS] token and the first [SEP] token.

The language model neural network may compute token scores for each token of the masked sequence of tokens or for each of the mask tokens of the masked sequence of tokens. Where token scores are computed for tokens other than mask tokens, then those tokens scores may not be used.

Text generation component 350 may receive the token scores and generate modified text according to the desired attribute value. Any appropriate techniques may be used to generate the modified text using the token scores. For example, text generation component 350, may, for each mask token, replace the mask token with the token having the highest token score. The modified text may then be used for any appropriate application, such as any of the applications described herein.

In some implementations, text generation component 350 may initially select multiple possible replacement tokens for each mask token using the token scores. Text generation component 350 may then use other techniques, such as a beam search, to select a final replacement token for each mask token. For example, a language model may be used to compute a score or probability for each possible combination of replacement tokens, and the final replacement tokens may be selected that have the highest score.

In some implementations, the processing of language model component 340 and text generation component 350 may be performed iteratively to further improve the quality of the modified text. For example, suppose the masked sequence of tokens includes three mask tokens. In some implementations, processing may proceed as follows.

In a first iteration, language model component 340 may compute token scores for each of the three mask tokens (or alternately for a single mask token). Text generation component 350 may then replace one mask token using the token scores for the mask tokens. For example, text generation component 350 may select a token with a highest token score across all of the mask tokens, and select that highest scoring token to replace the corresponding mask token. In a second iteration, language model component 340 may compute token scores for each of the remaining two mask tokens (since the third mask token has already been replaced with a replacement token). Text generation component 350 may then replace one mask token using the token scores for the mask token. In a third iteration, language model component 340 may compute token scores for the remaining mask token. Text generation component 350 may then replace the final mask token using the token scores for the mask token. In some implementations, a single iteration may replace more than one mask token instead of just a single mask token.

The components of FIG. 3 may contain mathematical models, such as neural networks, and the parameters of these components may be learned by performing a training procedure with a corpus of training data. The corpus of training data may include training items, where each training item includes text and an attribute corresponding to the text. For example, to train a system to modify text of reviews (e.g., restaurant reviews) to change a star rating of the review, a corpus of reviews may be used where a star rating is known for each of the reviews. Any appropriate techniques may be used to train the components of FIG. 3. For example, the mathematical models may be trained using a generative adversarial network, an adversarially regularized autoencoder, and/or alternating gradient descent.

Figure 4:
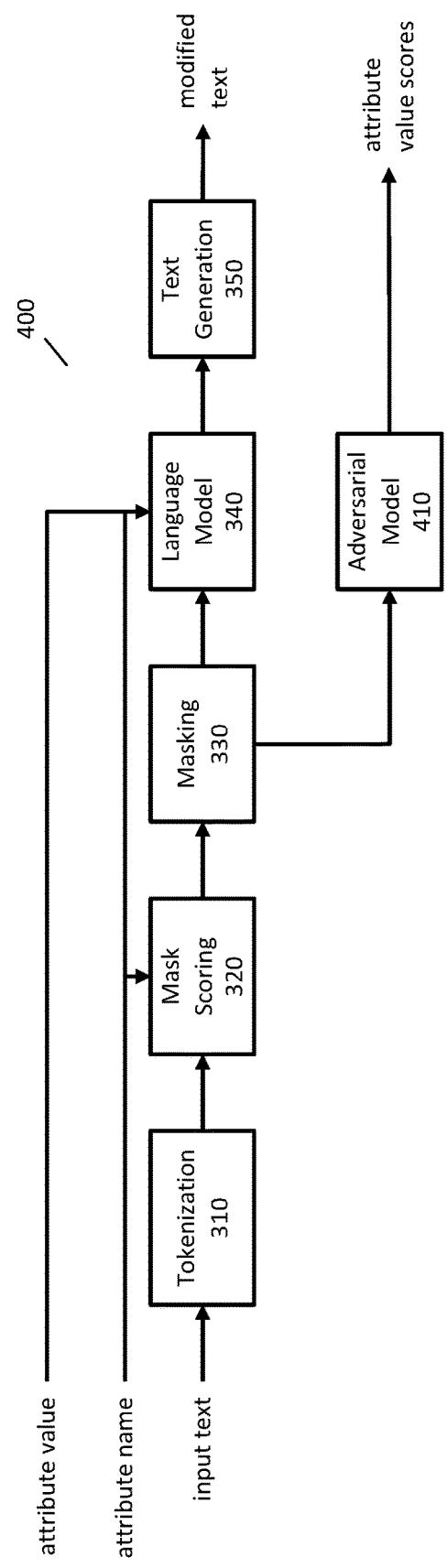
FIG. 4 is an example system for training mathematical models to change an attribute of text.

FIG. 4 is an example system 400 for training mathematical models to change an attribute of text. In FIG. 4, adversarial model component 410 has been added to assist in the training process. Adversarial model component 410 receives the masked sequence of tokens as input and attempts to determine the attribute value of the input text using the masked sequence of tokens. For example, adversarial model component 410 may be implemented as a classifier where the classes are the possible values of the attribute.

Adversarial model component 410 is working against masking component 330 because masking component 330 is removing tokens corresponding to the attribute value (e.g., to change the attribute value of the input text). Accordingly, where masking component 330 is operating correctly, adversarial model component 410 should not be able to correctly determine the attribute value of the input text. Adversarial model component 410 is referred to as adversarial because when adversarial model component 410 is able to determine the attribute value of the input text, the masking process in not masking tokens that should be masked.

During training, the training items may be iteratively processed by system 400. At each iteration, the input text and modified text are set to the text of a training item, and the attribute name and value are set to the known attribute of the training item. The input text is processed to mask tokens corresponding to the attribute name, and the masked sequence of tokens is then processed to regenerate the text of the training item using the attribute value.

The parameters of the mathematical models may be trained using the following loss functions:

$$c = x \odot z \text{ with } z \sim p(z|x, \Theta)$$

$$\mathcal{L}_G(\Theta) = \mathbb{E}_{x,y}(-\log p(x|c, y, \Theta))$$

$$\mathcal{L}_D(\Phi, \Theta) = \mathbb{E}_{x,y}(-\log p(y|c, \Phi, \Theta))$$

where $\Theta$ represents parameters of system 300 of FIG. 3, x corresponds to the input sequence of tokens, z is a vector of the same length as x that indicates a probability of masking a corresponding token as computed by mask scoring component 320, and c corresponds to the masked sequence of tokens.

The generation loss function $\mathcal{L}_G(\Theta)$ corresponds to the cross-entropy loss of the log probability of regenerating or reconstructing the input sequence of tokens from the masked sequence of tokens given the masked sequence of tokens, the known attribute value of the training sample (indicated as y), and the model parameters. The generation loss function may be computed from the training data as a sample-based expected value.

The discrimination loss function $\mathcal{L}_D(\Phi, \Theta)$ corresponds to the cross-entropy loss of the log probability of determining the attribute value of the training sample from the masked sequence of tokens, the parameters of adversarial model component 410 (indicated as $\Phi$), and the parameters $\Theta$ (since c is computed using $\Theta$). The discrimination loss function may be computed from the training data as a sample-based expected value.

The parameters $\Phi$ and $\Theta$ may then be computed as follows:

$$\operatorname*{argmin}_{\Theta} \operatorname*{max}_{\Phi} \mathcal{L}_G(\Theta) - \lambda \mathcal{L}_D(\Phi, \Theta)$$

where $\lambda$ is a hyperparameter that weights the interaction of the two loss functions.

In some implementations, one or more of a masking neural network, a mask-size neural network, and a language model network may be implemented by fine tuning a pretrained language model. Any appropriate pretrained language model may be used, such as a BERT pretrained language model as described in BERT: Pre-training of Deep Bidirectional Transformers for Language Understanding by Jacob Devlin, Ming-Wei Chang, Kenton Lee, and Kristina Toutanova (arXiv:1810.04805v2 available at https://arxiv.org/abs/1810.04805), which is hereby incorporated by reference.

In some implementations, a pretrained language model may be trained using an extremely large data set. By training the pretrained language model on a large data set, the pretrained language model may be more accurate than language models trained on smaller data sets. The pretrained language model may then be adapted or fine-tuned for other applications. For example, the pretrained language model may be fine-tuned for any of the masking neural network, the mask-size neural network, or the language model network described herein. The process of fine-tuning the pretrained language model may be less expensive computationally than the generation of the pretrained language model. Accordingly, the accuracy of the pretrained language model may be applied to a variety of applications for a lower cost than the original generation of the pretrained language model.

FIG. 5 is an example implementation of a pretrained language model. In FIG. 5, the input to the pretrained language model is a sequence of tokens (token 1, token 2, . . . token N) corresponding to input text. Any appropriate tokens may be used, such as any of the tokens described herein. The output of the pretrained language model is a vector of token scores for each of the input tokens (token scores 1, token scores 2, . . . token scores N). As with the token scores described above, the length of each token scores vector may be the number of tokens in the vocabulary. For an input token, each element of the corresponding token scores vector may be a token score indicating a match between the corresponding token of the vocabulary and the context of the input token in the input sequence of tokens. For example, for the input "the black cat", the token scores for the input token "the" may have high scores for vocabulary tokens "the" and "a" but low scores for the token "umbrella".

The operations of the pretrained language model may be represented as two components as shown in FIG. 5. Contextual token embeddings component 510 corresponds to one or more layers of the neural network that process the input sequence of tokens and output a contextual token embedding for each token of the input sequence of tokens. Contextual token embeddings component 510 may be implemented using any of the techniques described herein.

A contextual token embedding is a vector in a vector space that represents the meaning of the token in a similar manner to the token embeddings described above. The contextual token embedding, however, represents the meaning of the token in the context of the other tokens in the input sequence of tokens.

A token may have different meanings corresponding to the context. For example, the token "bank" may correspond to a financial institution or the bank of a river. Accordingly, the values of a contextual token embedding for the token "bank" in "I deposited money at the bank" and "I went fishing at the river bank" may be very different.

Language model layers 520 corresponds to one or more language model layers that process the contextual token embeddings to compute a token scores vector for each of the input tokens. Language model layers 520 may be implemented using any appropriate techniques, such as one or more of a linear layer of the size of the token vocabulary and a softmax layer.

FIG. 6 is an example implementation of a masking neural network and a language model neural network using a pretrained language model. In FIG. 6, the masking neural network is indicated by dashed line 640 and the language model neural network is indicated by dotted line 650. The masking neural network is implemented using a combination of contextual token embeddings component 610 and mask scoring layers 630. The language model neural network is implemented using a combination of contextual token embeddings component 610 and language model layers 620.

Contextual token embeddings component 610 may be implemented in a similar manner as contextual token embeddings component 510. In some implementations, contextual token embeddings component 610 may be the same as contextual token embeddings component 510. In some implementations, contextual token embeddings component 610 may be obtained by fine-tuning the parameters of contextual token embeddings component 510 using a training process, such as any of the training processes described herein.

Mask scoring layers 630 may process the contextual token embeddings and output mask scores for the input tokens, such as the mask scores described above. Mask scoring layers 630 may be implemented using any appropriate techniques, such as one or more of a linear layer of size one and a sigmoid layer.

Language model layers 620 may be implemented in a similar manner as language model layers 520. In some implementations, language model layers 620 may be the same as language model layers 520. In some implementations, language model layers 620 may be obtained by fine-tuning the parameters of language model layers 520 using a training process, such as any of the training processes described herein.

Efficiencies may be obtained by having masking neural network and language model neural network share the contextual token embeddings component 610. For example, by sharing this component the overall size of the models may be decreased, processing may be faster, training time may be reduced, and storage and memory requirements may be decreased.

In some implementations, a mask-size neural network may also be combined with masking neural network and language model neural network. A mask-size neural network may be implemented as a sequence of contextual token embeddings component 610 and mask-size layers (not shown) that compute a number of mask tokens for tokens of the input sequence. Mask-size layers may be implemented using any appropriate techniques, such as one or more of a linear layer of the size of the number of possible mask-token lengths and a softmax layer.

In some implementations, each of the masking neural network, mask-size neural network, and language model neural network may be implemented independently or separately. For example, the neural networks for each could be initialized using contextual token embeddings component 510, but each of the neural networks may then be fine-tuned separately from each and thus the neural networks would not share parameters. In some implementations, each of the neural networks may be initialized with a different contextual token embeddings component, may have different architectures, or may otherwise have different parameters from the each other.

FIG. 7 is a flowchart of an example method for modifying an attribute of text. In FIG. 7 and other flowcharts herein, the ordering of the steps is exemplary and other orders are possible, not all steps are required, and steps may be combined or divided. The methods described by any flowcharts described herein may be implemented, for example, by any of the computers or systems described herein.

At step 710, an input sequence of tokens is obtained, wherein the input sequence of tokens corresponds to input text. The input text may correspond to any appropriate application. For example, the input text may relate to a message to be suggested to a user in a messaging application or the input text may be text of a review (e.g., a restaurant review). The input sequence of tokens may be obtained using any appropriate techniques. For example, the tokens of the input sequence of tokens may correspond to words, word-piece encodings, or byte-pair encodings.

At step 720, a first attribute value is obtained where it is desired to modify the input text to match the first attribute value. In some implementations, a first attribute name may also be received, such as when the attribute value could correspond to more than one attribute name. Any appropriate attribute value and/or name may be obtained, such as any of the attributes described herein.

At step 730, mask scores are computed by processing the input sequence of tokens with a masking neural network. The masking neural network may be implemented using any appropriate neural network, such as any of the neural networks described herein. In some implementations, the input sequence of tokens may be modified to include other tokens, such as a token representing the attribute to be modified or any of the other tokens described herein. The masking neural network may also process the tokens directly or may process another representation of the tokens, such as a token embedding. A mask score may indicate a match between a token and the attribute, and thus indicating the utility of masking the token to modify an attribute value of the input text.

At step 740, a first token of the input sequence of tokens is selected using the mask scores. In some implementations or instances, additional tokens may also be selected using the mask scores. Any appropriate techniques may be used to select the first token, such as selecting a token corresponding to a highest score or selecting all tokens with scores above a threshold.

At step 750, a masked sequence of tokens is generated by replacing the first token with a first mask token. A first mask token may be an instance of a special token that indicates that a token has been masked from the input sequence. Where more than one token is selected at step 740, each of the selected tokens may be replaced by a mask token. For example, a second token may be replaced by a second mask token and so forth.

At step 760, first token scores are computed for the first mask token by processing the masked sequence of tokens and the first attribute value with a language model neural network. Where additional tokens are selected at step 740, token scores may also be computed for other mask tokens in the masked sequence of tokens. For example, second token scores may be computed for a second mask token.

The language model neural network may be implemented using any appropriate neural network, such as any of the neural networks described herein. In some implementations, the masked sequence of tokens may be modified to include other tokens, such as a token representing the attribute to be modified or any of the other tokens described herein. The language model neural network may also process the tokens directly or may process another representation of the tokens, such as a token embedding. A token score may indicate a match between a token and the desired attribute value, and thus indicating the utility of the token for expressing the desired attribute value.

At step 770, a first replacement token is selected from a vocabulary of tokens using the first token scores. Where additional tokens are selected at step 740, replacement tokens may also be selected for other mask tokens in the masked sequence of tokens. For example, a second replacement token may be selected for a second mask token. Any appropriate techniques may be used to select the first replacement token, such as selecting a token corresponding to a highest score.

In some implementations, multiple possible replacement tokens may be selected for each mask token and additional processing may be performed, such as a beam search, to select a final replacement token for each mask token. In some implementations, steps 760 and 770 may be performed in multiple iterations to sequentially replace mask tokens with replacement tokens.

At step 780, modified text is generated using the first replacement token. Where more than one token was selected at step 740, then the modified text may be generated using the replacement token for each of the mask tokens. Any appropriate techniques may be used to generate the modified text. For example, a final sequence of tokens may be generated by replacing each of the mask tokens with a corresponding replacement token. The modified text may then be generated by concatenating or joining a text or string representation of each token of the final sequence of tokens. The modified text may then be used in any appropriate application, such as any of the applications described herein.

An example application that uses the above techniques is now described. The example relates to a message suggestion service that may be used to suggest a message to a user participating in a conversation. A message suggestion service may be implemented using any of the techniques described in U.S. patent application Ser. No. 16/663,872; U.S. patent application Ser. No. 16/054,473; or U.S. patent application Ser. No. 16/035,062; each of which is incorporated by reference in its entirety for all purposes.

People may exchange messages with each other using a variety of techniques and in a variety of situations. For example, a person may type or speak a message to an app running on his device, type or speak a message on a web page, send a text message, or send an email. As used herein, a text message includes (i) any message sent as text including but not limited to a message sent using SMS (short message service) or a special-purpose application (e.g., Facebook messenger, Apple iMessage, Google Hangouts, or WhatsApp) and (ii) any message sent using audio where text of the audio may be obtained using automatic speech recognition techniques. People may exchange messages for any appropriate purpose, such as social interactions, business interactions, or to request customer support from a company. The techniques described herein are not limited to any manner of or purpose for exchanging messages.

Entering a message may be cumbersome as compared to speaking directly with a person. For example, entering a message with a keyboard (especially on a mobile device) or even dictating a message using automatic speech recognition may take more time and attention than desired and may contain errors or typos.

To facilitate the process of entering a message, one or more suggested messages may be presented to a person. Messages may be suggested to a person based on the context of the conversation. For example, a user may receive a message "How are you?" and a suggested response may be "I am fine." These suggested messages may be updated throughout the conversation as additional messages are exchanged.

The process of suggesting messages to a person may be improved by using a set of designated messages. A set of designated messages may include a set of all messages that may be suggested to a person. For example, where messages are suggested in the context of a customer seeking support from a company, the set of designated messages may include a number of most common messages from logs of customer support sessions. The number of designated messages may be small or large, such as obtaining 10,000 designated messages from customer support logs.

Suggesting messages from a set of designated messages may provide benefits when suggesting messages to users. For example, the set of designated messages may be reviewed to prevent the suggestion of inappropriate messages (e.g., profanity), messages with poor grammar, or ambiguous messages. A set of designated messages may also be crafted so that suggested messages have a desired tone or level of formality.

The process of suggesting messages to a user may also be improved by modifying an attribute of a suggested message to better match the conversation. Any appropriate attribute of a suggested message may be modified, such as any of the attributed described herein. For example, an attribute of a message may be the time of day that the message was sent. A designated message may be associated with an attribute value of "morning", such as the message "Good morning." When suggesting a message in the afternoon, it may be desired to change the time of day attribute to "afternoon" so that the suggested message may be "Good afternoon."

Figure 8:
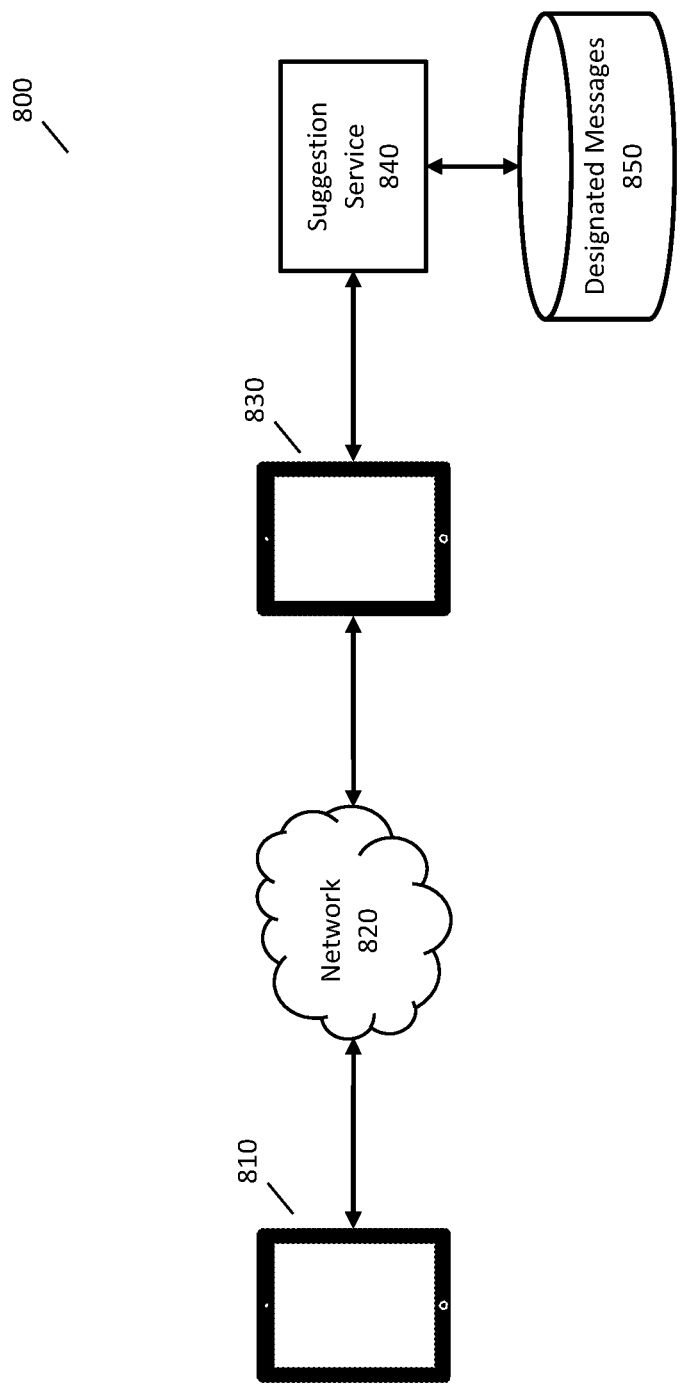
FIG. 8 is an example system for suggesting messages to a user.

FIG. 8 is an example system 800 for suggesting messages to a user. In system 800, a first user may use device 810 to transmit a message to a second user. For example, the first user may be a customer of a company and the second user may be a customer support representative for the company. The message may be transmitted using network 820, which may be any appropriate network such as the Internet or cellular data network.

A second user may receive the message at device 830. The second user may use suggestion service 840 to receive suggestions of messages to send back to the first user. Suggestion service 840 may obtain suggested messages from designated messages data store 850, which may store a set of designated messages that may include all messages that may be suggested to the second user. Suggestion service 840 may perform any appropriate techniques to determine one or more suggested messages to present to the second user.

Suggestion service 840 may perform two operations: (i) selecting one more designated messages and (ii) modifying an attribute of a designated message. The implementation of suggestion service may depend on the order of these two operations, and further details are now presented of two example implementations. FIGS. 9A and 9B are two example implementations of a suggestion service.

In FIG. 9A, system 900 modifies the designated messages to have a specified attribute and then selects one or more of the modified designated messages as message suggestions. Attribute modification component 910 receives one or more desired attributes for a suggested message (e.g., time of day). Attribute modification component 910 then processes designated messages from designated messages data store 850 to generate a set of modified designated messages.

Message selection component 920 receives information about the conversation (e.g., previous messages in the conversation, information about the users participating in the conversation, and conversation metadata) and selects one or more of the modified designated messages as suggested messages for a user participating in the conversation. Message selection component 920 may be implemented using any appropriate techniques, such as any of the techniques described in the patents and patent applications incorporated by reference.

In FIG. 9B, system 901 selects one or more of the designated messages as message suggestions and then modifies the selected designated messages to have a specified attribute. Message selection component 921 receives information about the conversation and selects one or more designated messages from designated messages data store 850 as suggested messages for a user participating in the conversation. Attribute modification component 911 then processes the selected designated messages to modify them according to the specified attributes.

The suggested messages output by system 900 or system 901 may then be suggested to a user as described in the patents and patent applications incorporated by reference.

Figure 10:
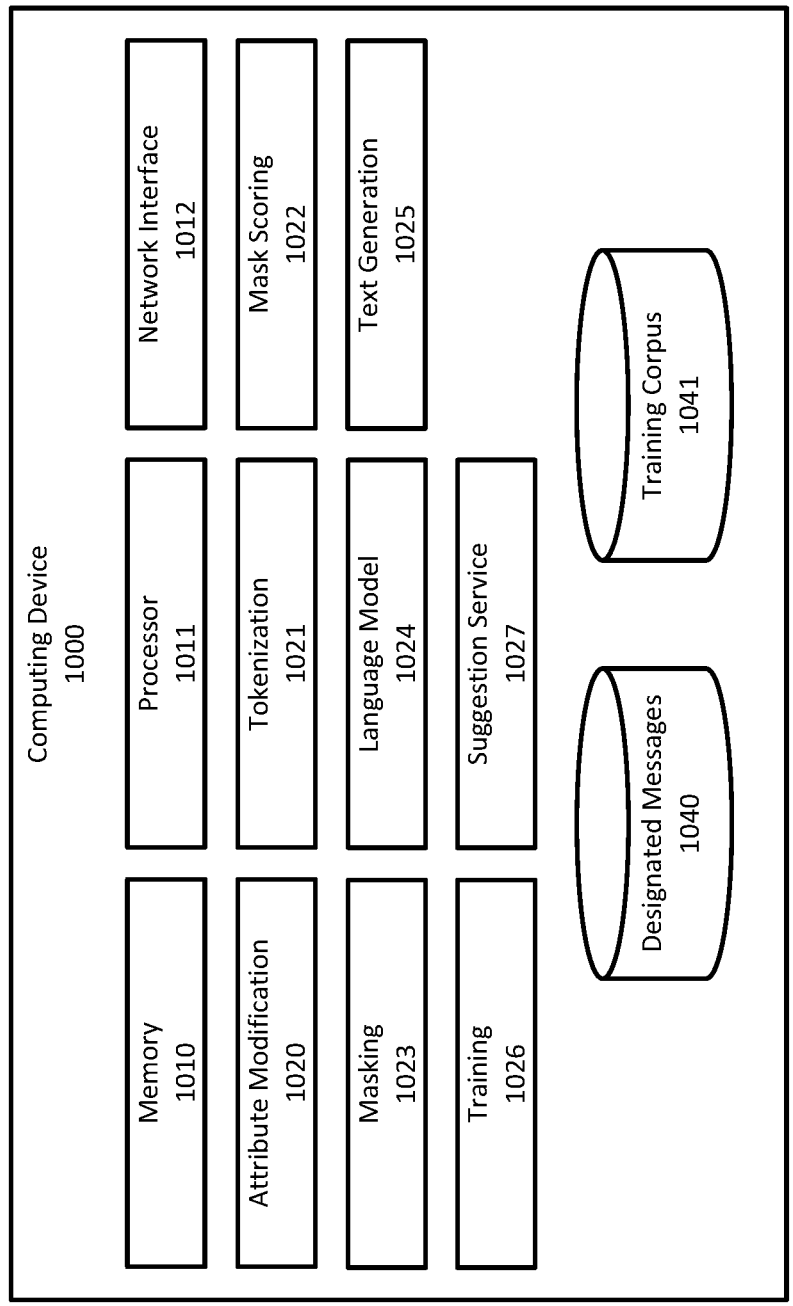
FIG. 10 is an example computing device for modifying an attribute of text.

FIG. 10 illustrates components of one implementation of a computing device 1000 for implementing any of the techniques described above. In FIG. 10, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 1000 may include any components typical of a computing device, such as volatile or nonvolatile memory 1010, one or more processors 1011, and one or more network interfaces 1012. Computing device 1000 may also include any input and output components, such as displays, keyboards, and touch screens. Computing device 1000 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1000 may have an attribute modification component 1020 that may receive text and an attribute value and modify the text to match the specified attribute value using any of the techniques described herein. Computing device 1000 may have a tokenization component 1021 that may tokenize text using any of the techniques described herein. Computing device 1000 may have a mask scoring component 1022 that may compute mask scores for tokens of text according to a specified attribute using any of the techniques described herein. Computing device 1000 may have a masking component 1023 that may select one or more tokens of text for masking using mask scores and using any of the techniques described herein. Computing device 1000 may have a language model component 1024 that may compute token scores for tokens of text according to an attribute value using any of the techniques described herein. Computing device 1000 may have a text generation component 1025 that may generate modified text using token scores and using any of the techniques described herein. Computing device 1000 may have a training component 1026 that may train one or more mathematical models using any of the techniques described herein. Computing device 1000 may have a suggestion service component 1027 that may suggest messages to a user participating in a conversation using any of the techniques described herein.

Computing device 1000 may include or have access to various data stores. Data stores may use any known storage technology such as files, relational databases, non-relational databases, or any non-transitory computer-readable media. Computing device 1000 may have designated messages data store 1040 that may store a set of designated messages that may be used to suggest messages to a user. Computing device 1000 may have training corpus data store 1041 that may be used to train mathematical models for modifying an attribute of text or for suggesting messages.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for modifying text according to a specified attribute value, comprising:
   obtaining an input sequence of tokens corresponding to input text;
   obtaining a first attribute value;
   computing mask scores corresponding to the input sequence of tokens by processing the input sequence of tokens with a masking neural network;
   selecting a first token of the input sequence of tokens using the mask scores;
   generating a masked sequence of tokens by replacing the first token of the input sequence of tokens with a first mask token;
   computing first token scores for the first mask token by processing the masked sequence of tokens and the first attribute value with a language model neural network;
   selecting a first replacement token using the first token scores; and
   generating modified text by replacing the first mask token with the first replacement token.

2. The computer-implemented method of claim 1, comprising:
   obtaining a first attribute name; and wherein:
      computing the mask scores comprises processing the first attribute name with the masking neural network, and
      computing the first token scores comprises processing the first attribute name with the language model neural network.

3. The computer-implemented method of claim 2, comprising:
   obtaining a second attribute name and a second attribute value;
   computing the mask scores comprises processing the second attribute name with the masking neural network;
   computing the first token scores comprises processing the second attribute name, and the second attribute value with the language model neural network.

4. The computer-implemented method of claim 1, wherein processing the input sequence of tokens with the masking neural network comprises:
   generating an input to the masking neural network, wherein the input comprises representations of the input sequence of tokens, a token indicating a separator, and a token corresponding to a first attribute name; and
   processing the input with the masking neural network.

5. The computer-implemented method of claim 1, wherein the language model neural network comprises bidirectional encoder representations from transformers.

6. The computer-implemented method of claim 1, wherein selecting the first replacement token comprises selecting a token corresponding to a highest score of the first token scores.

7. The computer-implemented method of claim 1 comprising,
   selecting a second token of the input sequence of tokens using the mask scores;
   wherein generating the masked sequence of tokens comprises replacing the second token with a second mask token;
   computing second token scores for the second mask token;
   selecting a second replacement token using the second token scores; and
   wherein generating the modified text comprises using the second replacement token.

8. The computer-implemented method of claim 1, comprising:
   replacing a consecutive sequence of mask tokens in the masked sequence of tokens with a single mask token;
   computing a number of mask tokens by processing the masked sequence of tokens and the first attribute value with a mask-size neural network; and
   modifying the masked sequence of tokens by replacing the single mask token with the number of mask tokens.

9. A system, comprising:
   at least one server computer comprising at least one processor and at least one memory, the at least one server computer configured to:
      obtain an input sequence of tokens corresponding to input text;
      obtain a first attribute value;
      compute mask scores corresponding to the input sequence of tokens by processing the input sequence of tokens with a masking neural network;
      select a first token of the input sequence of tokens using the mask scores;
      generate a masked sequence of tokens by replacing the first token of the input sequence of tokens with a first mask token;
      compute first token scores for the first mask token by processing the masked sequence of tokens and the first attribute value with a language model neural network;
      select a first replacement token using the first token scores; and
      generate modified text by replacing the first mask token with the first replacement token.

10. The system of claim 9, wherein the at least one server computer is configured to:
    obtain information about a conversation between a first user and a second user;
    select the input text from a plurality of designated messages using the information about the conversation; and
    present the modified text as a suggestion to the second user.

11. The system of claim 10, wherein the first user is a customer of a company and the second user is a customer support representative.

12. The system of claim 9, wherein the masking neural network and the language model neural network are obtained by fine-tuning a pretrained language model.

13. The system of claim 12, wherein the masking neural network and the language model neural network share a component for computing contextual token embeddings.

14. The system of claim 9, wherein the at least one server computer is configured to processing the masked sequence of tokens with the language model neural network by:
    generating an input to the language model neural network, wherein the input comprises representations of the masked sequence of tokens, a token indicating a separator, and a token corresponding to the first attribute value; and processing the input with the language model neural network.

15. The system of claim 9, wherein the masking neural network comprises a deep bidirectional transformer.

16. The system of claim 9, wherein the at least one server computer is configured to:

select a second token of the input sequence of tokens using the mask scores;

generate the masked sequence of tokens by replacing the second token with a second mask token;

modify the masked sequence of tokens to replace the first mask token with the first replacement token; and after the masked sequence of tokens is modified:

compute second token scores for the second mask token by processing the modified masked sequence of tokens and the first attribute value with the language model neural network, select a second replacement token using the second token scores, and generate the modified text using the second replacement token.

17. One or more non-transitory, computer-readable media comprising computer-executable instructions that, when executed, cause at least one processor to perform actions comprising:

obtaining an input sequence of tokens corresponding to input text;

obtaining a first attribute value;

computing mask scores corresponding to the input sequence of tokens by processing the input sequence of tokens with a masking neural network;

selecting a first token of the input sequence of tokens using the mask scores;

generating a masked sequence of tokens by replacing the first token of the input sequence of tokens with a first mask token;

computing first token scores for the first mask token by processing the masked sequence of tokens and the first attribute value with a language model neural network;

selecting a first replacement token using the first token scores; and generating modified text by replacing the first mask token with the first replacement token.

18. The one or more non-transitory, computer-readable media of claim 17, wherein the first attribute value corresponds to one or more of a rating, an intent, a sentiment, a named entity, a tone, a verb tense, or a person.

19. The one or more non-transitory, computer-readable media of claim 17, wherein the masking neural network and the language model neural network were trained using an adversarial network.

20. The one or more non-transitory, computer-readable media of claim 17, wherein obtaining the input sequence of tokens comprises using token indices into a vocabulary of words, byte-pair encodings, or word-piece encodings.

21. The one or more non-transitory, computer-readable media of claim 17, wherein selecting the first token comprises comparing the mask scores to a threshold.

* * * * *